United States Patent Office 3,503,954
Patented Mar. 31, 1970

3,503,954
WATER-INSOLUBLE MONOAZO DYESTUFFS
Helmut Gies, Hofheim, Taunus, Germany, assignor to Farbwerke Hoechst Aktiengesellschaft vormals Meister Lucius & Bruning, Frankfurt am Main, Germany, a corporation of Germany
No Drawing. Filed July 13, 1966, Ser. No. 564,757
Claims priority, application Germany, July 23, 1965,
F 46,701
Int. Cl. C07c *107/06;* C09b *29/26*
U.S. Cl. 260—205                                   6 Claims

ABSTRACT OF THE DISCLOSURE

A water-insoluble monoazo dyestuff of the formula

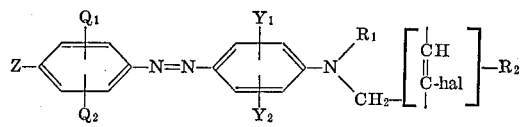

wherein Z represents chlorine, bromine, nitro, cyano, carbalkoxy or lower alkyl or trifluorinated methyl group, $Q_1$ and $Q_2$ stand for hydrogen, chlorine, bromine, cyano, nitro —COO—alkyl, lower alkyl, lower alkoxy or trifluorinated methyl group, $Y_1$ represents hydrogen or lower alkoxy, $Y_2$ stands for hydrogen, or lower alkyl, chlorine, formylamino, $R_1$ represents hydrogen, lower alkyl, lower alkylene-OH, lower alkylene-CN, lower alkylene-O-lower alkylene-CN, lower alkylene-O-acyl, lower alkylene-NH—SO$_2$-lower alkyl, lower alkylene—C—O—lower alkyl,
‖
O monochlorinated lower alkenyl, monobrominated lower alkenyl, lower alkylene-SO$_2$-lower alkyl or lower alkylene—COO—phenyl and $R_2$ represents hydrogen or lower alkyl.

---

The present invention provides water-insoluble monoazo dyestuffs and a process for preparing them; it provides in particular water-insoluble monoazo dyestuffs of the general formula

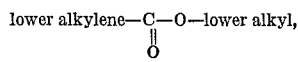

wherein $R_1$ represents a hydrogen atom or an alkyl or alkenyl group which may be substituted, $R_2$ represents a hydrogen atom or a low molecular alkyl group, Z stands for a negative substituent which does not impart solubility in water and the benzene nuclei A and B may contain further substituents which do not impart solubility in water.

Now we have found that water insoluble monoazo dyestuffs of the general Formula 1

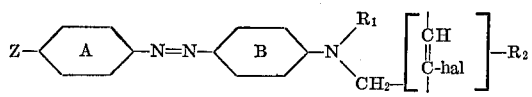

wherein $R_1$ represents a hydrogen atom or an alkyl or alkenyl group which may be substituted, $R_2$ represents a hydrogen atom or a low molecular alkyl group, Z stands for a negative substituent which does not impart solubility in water and the benzene nuclei A and B may contain further substituents which do not impart solubility in water, can be obtained by coupling in an acid medium the diazonium compound of an amine of the benzene series, which carries in 4-position a negative substituent not imparting solubility in water and which may contain on the benzene nucleus further substituents not imparting solubility in water, in 4-position with an amine of the general Formula 2

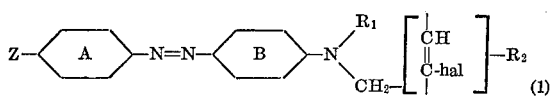

wherein $R_1$ and $R_2$ have the meanings given above and the benzene nucleus B may contain further substituents not imparting solubility in water.

As amines from which the diazonium compounds to be used are derived, and which contain in 4-position a negative substituent which does not impart solubility in water, there may be used such aminobenzene derivatives which contain in 4-position for example a halogen atom or a nitro, nitrile, trifluoromethyl or carboxylic acid ester group and which, moreover, carry on the benzene nucleus further groups not imparting solubility in water, for example, halogen atoms, nitro, nitrile, trifluoromethyl, carboxylic acid ester or alkoxy groups.

The amines of the general Formula 2 mentioned above being employed as coupling components may carry on the benzene nucleus B groups not imparting solubility in water, for example, halogen atoms, alkyl, trifluoromethyl, alkoxy or acylamino groups.

The alkyl or alkenyl groups which in addition to hydrogen may stand for $R_1$, may for example be substituted by halogen atoms or hydroxyl or nitrile groups or by the groupings —O—alkyl, —O—acyl, for example —O—C—alkyl
‖
O moreover —O—C$_2$H$_4$—SN, —SO$_2$—alkyl, —NH—SO$_2$—alkyl,

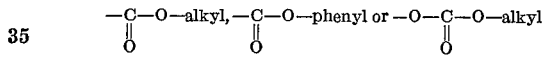

The coupling is effected in an acid medium, if necessary, in the presence of acid-binding agents, for example, sodium acetate or magnesium oxide. The dyestuffs obtainable by this method are worked up in the usual manner with dispersing agents to dyeing preparations, which yield on materials made of polyester, triacetate and 2½-acetate fibres dyeings of excellent fastness properties. These dyeings are superior to dyeings produced by dyestuffs which carry instead of the group

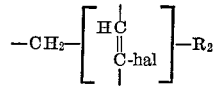

an unsubstituted alkyl group on the nitrogen atom, in so far as they show a better fastness to thermofixation and light without being inferior, however, as regards their building up properties. Compared to dyestuffs which do not carry a halogen atom on the double linkage of an alkenyl group, the above dyestuffs have a higher ability to resist wool and are less sensitive to a change of the pH-value. For the dyeing of polyester materials the new dyestuffs are advantageously used in the form of the above-mentioned dyeing preparations, which are then applied in aqueous suspension at temperatures superior to 100° C. under pressure or at approximately 100° C. while adding the usual carriers.

The new dyestuffs form on materials made of polyethylene terephthalate fibres yellow, orange, red, brown and blue dyeings having excellent fastness properties.

The following examples serve to illustrate the invention.

EXAMPLE 1

196.5 parts by weight of 2,4,6-trichloro-1-aminobenzene are diazotised in the usual manner and the diazo solution obtained is slowly added to a solution of 256 parts by weight of N-(hydroxyethyl)-N-(β-bromallyl)-aniline in 1500 parts by weight of hydrochloric acid of 36% strength. After one hour the reaction mixture is diluted with water to 1500 parts by volume and after 24 hours the dyestuff which has separated is filtered and dried. It is an orange crystalline powder which in its dispersed form dyes a tissue made of polyethylene terephthalate fibres in the presence of o-phenyl-phenol as carrier at 100° C. deep, golden yellow shades. The dyeings obtained have good fastness to light and subliming.

It is also possible to use other carriers instead of the o-phenyl-phenol mentioned above, for example diphenyl, chlorobenzene and 2 - hydroxytoluene - 3 - carboxylic acid ester.

thermosol-method. The yellowish red dyeings obtained have very good fastness to light and subliming.

The following table lists further water-insoluble monoazo dyestuffs obtainable according to Examples 1 to 3. Their structure corresponds to the general formula

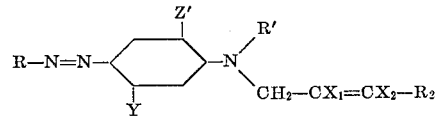

and they are characterized in the following table by the radicals R, $R_1$, $R_2$, $X_1$, $X_2$, Y and Z' and by the shades produced on materials of polyethylene terephthalate fibres.

| Example | R | $R_1$ | $R_2$ | $X_1$ | $X_2$ | Z | Y | Shade on polyester fibres |
|---|---|---|---|---|---|---|---|---|
| 4 | 2-cyano-4-nitrophenyl | $C_2H_4OH$ | $CH_3$ | H | Cl | H | H | Bluish red. |
| 5 | do | $C_2H_4CN$ | $CH_3$ | H | Cl | H | H | Yellowish red. |
| 6 | do | H | H | Br | H | H | H | Red. |
| 7 | do | $C_2H_4OH$ | H | Br | H | H | H | Bluish red. |
| 8 | do | $C_2H_4OH$ | H | Cl | H | H | H | Do. |
| 9 | do | $C_2H_4OH$ | H | H | Cl | H | H | Do. |
| 10 | do | $C_2H_4CN$ | H | H | Cl | H | H | Yellowish red. |
| 11 | do | $C_2H_4\overset{O}{\overset{\|}{C}}$—O$C_2H_5$ | H | Br | H | H | H | Red. |
| 12 | do | $C_2H_4$—O—$\overset{\|}{\underset{O}{C}}$—$CH_3$ | H | Cl | H | H | H | Red. |
| 13 | do | $C_2H_4O$—$C_2H_4CN$ | H | Br | H | H | H | Bluish red. |
| 14 | do | $C_2H_5$ | H | Br | H | H | H | Violet. |
| 15 | do | $C_2H_4\overset{H}{\overset{\|}{N}}$—$SO_2CH_3$ | H | Br | H | H | H | Bluish red. |
| 16 | do | $C_2H_4O\overset{O}{\overset{\|}{C}}$—O$CH_3$ | H | Br | H | H | H | Red. |
| 17 | 2,4-dinitrophenyl | $C_2H_4CN$ | H | Br | H | H | H | Yellowish red. |
| 18 | do | $C_2H_4CN$ | H | Br | H | H | $CH_3$ | Bluish red. |
| 19 | do | $C_2H_4CN$ | H | Br | H | H | Cl | Red. |
| 20 | 2-cyano-4-nitrophenyl | H | H | Br | H | H | NH—COO—$CH_3$ | Bluish red. |
| 21 | 6-chloro-2,4-dinitrophenyl | H | H | Br | H | $OC_2H_5$ | NHCOO$CH_3$ | Blue. |
| 22 | 2-cyano-4-nitrophenyl | H | H | Br | H | $OCH_3$ | Cl | Red. |
| 23 | 4-cyano-2-nitrophenyl | H | H | Br | H | H | NHCOO$CH_3$ | Yellowish red. |
| 24 | 2-cyaono-4-nitrophenyl | $C_2H_4CN$ | H | Br | H | H | H | Orange. |
| 25 | 4-nitro-2-carbomethoxy-phenyl | $C_2H_4COOCH_3$ | H | Br | H | H | H | Do. |
| 26 | 2-nitro-4-trifluoromethyl-phenyl | $C_2H_4OH$ | H | Br | H | H | H | Do. |
| 27 | 4-nitro-2-chloro-3-hydroxy-ethoxyphenyl | $C_2H_4OH$ | H | Br | H | H | H | Red. |
| 28 | 4-nitrophenyl | $CH_2CBr=CH_2$ | H | Br | H | H | NHCOO$CH_3$ | Red. |
| 29 | 2-nitro-4-carbomethoxy-phenyl | H | H | Br | H | H | NHCO$CH_3$ | Orange. |
| 30 | 4-nitro-2-methyl-phenyl | $CH_2$—CH=$\underset{Cl}{\overset{\|}{C}}$—$CH_3$ | H | Br | H | H | H | Do. |

EXAMPLE 2

207 parts by weight of 2,6-dichloro-4-nitro-1-aminobenzene are diazotised in the well known manner. The diazo solution thus obtained is slowly added to 211.5 parts by weight of N-(hydroxyethyl)-N - (β - chloroallyl) - aniline while thoroughly stirring. After one hour the reaction mixture is diluted 10,000 parts by volume of water. After 3 hours the pH-value is adjusted to 3 by means of sodium hydroxide solution and after another 12 hours the dyestuff which has separated is filtered and dried. It is a dark brown powder which in its dispersed form dyes materials made of polyethylene terephthalate fibres at 120° C. yellow-brown shades. The dyeing obtained has very good fastness to light and subliming.

EXAMPLE 3

163 parts by weight of 2-cyano-4-nitroaniline are diazotised in the usual manner whereupon 265 parts by weight of N-(cyanoethyl)-N-(β-bromallyl)-aniline are dropped into the diazo solution obtained, while thoroughly stirring. After one hour the reaction mixture is diluted with 10,000 parts by volume of ice water, after 3 hours the pH-value is adjusted to 3 by means of sodium hydroxide solution and after another 12 hours the dyestuff which has separated is filtered and dried. It is a red powder which in its dispersed form is an excellent dyestuff for dyeing tissues made of polyethylene terephthalate fibres according to the

I claim:
1. A water-insoluble monoazo-dyestuff of the formula

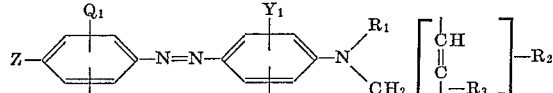

wherein Z represents chlorine, nitro, trifluoromethyl, cyano or carbomethoxy, $Q_1$ represents hydrogen chlorine, cyano, nitro, methyl or carbomethoxy, $Q_2$ represents hydrogen, chlorine or —O—$CH_2$—$CH_2$—OH, $Y_1$ represents hydrogen, methoxy or ethoxy, $Y_2$ represents hydrogen, chlorine, methyl, —NH—CO—$CH_3$ or

—NH—COO—$CH_3$ $R_1$ represents hydrogen, ethyl, β-hydroxyethyl, β-cyanoethyl,

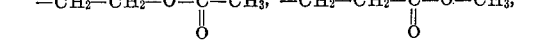
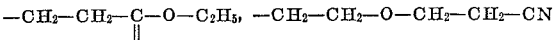
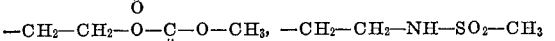
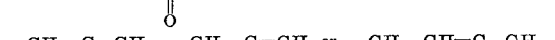

$R_2$ represents hydrogen or methyl, and $R_3$ represents chlorine or bromine.

2. The water-insoluble monoazo dyestuff of the formula

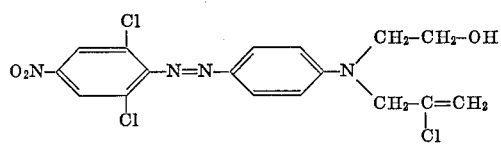

3. The water-insoluble monoazo dyestuff of the formula

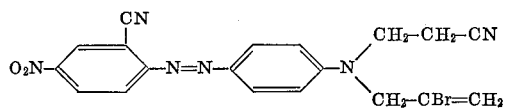

4. The water-insolbule monoazo dyestuff of the formula

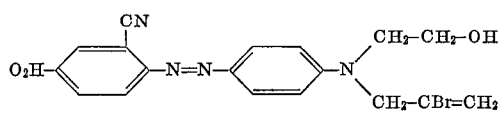

5. The water-insoluble monoazo dyestuff of the formula

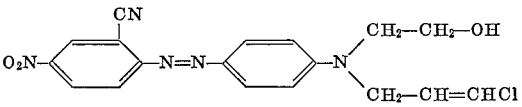

6. The water-insoluble monoazo dyestuff of the formula

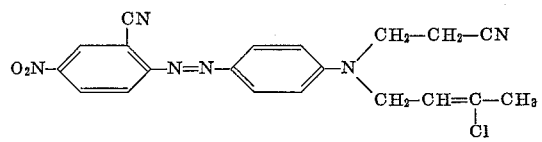

References Cited
UNITED STATES PATENTS 2,432,393 12/1947 Dickey et al. _____ 260—207.5
3,123,595 3/1964 Brugger et al. _____ 260—205

CHARLES B. PARKER, Primary Examiner
CHARLES F. WARREN, Assistant Examiner

U.S. Cl. X.R.
260—206, 207, 207.1, 207.5; 8—41, 55